United States Patent [19]

Underwood

[11] Patent Number: 4,521,367
[45] Date of Patent: Jun. 4, 1985

[54] MOLD, PROCESS OF MOLDING, AND ARTICLE MOLDED BY SUCH PROCESS

[76] Inventor: J. Larry Underwood, c/o Underwood Mold Company, Inc., 104 Dixie Dr., Woodstock, Ga. 30188

[21] Appl. No.: 321,570
[22] Filed: Nov. 16, 1981
[51] Int. Cl.³ .............................................. B29F 1/14
[52] U.S. Cl. .................................... 264/318; 264/335; 425/DIG. 102
[58] Field of Search .............................. 264/318, 335; 425/DIG. 102

[56] References Cited

U.S. PATENT DOCUMENTS

| | | | |
|---|---|---|---|
| 2,148,084 | 2/1939 | Nock | 425/DIG. 102 |
| 3,124,626 | 3/1964 | Graham et al. | 264/335 |
| 3,175,258 | 3/1965 | Rohrer et al. | 425/DIG. 102 |
| 3,325,576 | 6/1967 | Kessler | 264/318 |
| 3,444,288 | 5/1969 | Mead | 264/335 |
| 3,898,314 | 8/1975 | Church | 425/DIG. 102 |
| 4,289,726 | 9/1981 | Potoczky | 264/335 |

FOREIGN PATENT DOCUMENTS 43-12023  5/1968  Japan ................................. 264/335

Primary Examiner—James H. Derrington
Attorney, Agent, or Firm—Barnes & Thornburg

[57] ABSTRACT

An article having a flange is molded between a mold core and a unitary mold cavity, the flange being formed during the process as a consequence of the existence of an undercut existing in a first surface of the cavity. A ridge is provided on a second surface of the mold cavity adjacent the undercut. A fluid, i.e., air, is injected between the cavity and the molded article as the core and cavity separate in such a volume and at such a pressure as will maintain the article in substantially complete and constant contact with the core as the core and article are withdrawn from the cavity. The flange conforms to the cavity wall until the article is free from the cavity, and subsequently the molded article is separated from the mold core.

13 Claims, 6 Drawing Figures

MOLD, PROCESS OF MOLDING, AND ARTICLE MOLDED BY SUCH PROCESS

The present invention is directed generally to molds and processes of molding thermoplastics to form articles having particularly desirable features. The invention is directed particularly to a mold having a unique design, articles formed by injection-molding thermoplastics in a mold of that design, and the process of removing such articles from the mold so as to retain features created in the molding operation.

The injection-molding of thermoplastics is a well-known process by which plastics generally in granular pellet or powdered form are first heated to a viscous melted state and then injected under high pressure into a mold where the plastic cools to a solid shape conforming to the contours of the mold walls. The resulting articles are usually finished parts requiring no further work prior to assembly into or use as finished products. Many details of the finished parts or finished products such as bosses, flanges, locating pins, ribs, bushings, mounting holes, and the like have been molded as a single operation, and the design of injection molds for creating such details is an advanced art.

In general, a mold comprises a mold cavity and a mold core, the molded article being formed between the opposed core and cavity when the viscous melted thermoplastic is injected into the space between the core and cavity. The term "cavity" is used in the conventional sense employed by plastics engineers to refer to the mold element which cooperates with the mold core to form the mold space into which the thermoplastic is injected. When the article is sufficiently cool so as to retain its shape, the core and cavity separate one from the other and the article is then removed, usually with the aid of an ejector means, from the space between the core and cavity.

In order that many details such as bosses, ribs, mounting holes, and the like might be formed, the mold may include additional specialized mold components. For example, a hole or small detail in a molded article is often formed by having a core pin extending into the cavity. Undercuts, flanges, and other similar configurations have been made by having a split cavity or a side core or slide-action element as part of the cavity. Such slides and side cores are caused to retract the critical distance before or during the mold opening, thereby freeing the entrapped section of the article and allowing its ejection. Typically, the retraction or core pulling is actuated in a number of ways, either by hydraulic or air cylinders, springs, or mechanical cam action. The disadvantage of such split cavities, side cores or slide-action elements is that the design and execution of the mold with the action elements are much more exacting and expensive than molds having no moving elements other than merely the core and unitary cavity.

Therefore, an object of the present invention is to design a cavity which will form an undercut, flange, or other similar configuration on an article which can be ejected without requiring any side core or slide-action element in the mold.

Another object of the present invention is to employ such a mold in combination with a molding apparatus in a particular manner so as to permit ejection of the molded article from the mold in the absence of any side core, slide-action, or other moving element to the mold.

A further object of the present invention is to design articles having incidental features placed adjacent to flanges and the like which will permit extraction from the mold in the absence of any side core or slide-action element in the cavity of the mold.

A particular object of the present invention is to form a straight wall container having a radially outwardly extending flange at the bottom of said container, which flange may be formed in a unitary mold cavity and extracted from the cavity in the absence of any partition of the mold cavity.

These and other objects of the present invention are achieved by including in a unitary mold cavity an undercut or other configuration where an article formed in the mold would not normally be able to be freed by the mold opening in the absence of some slide-action element, and incorporating in that mold means for injecting a fluid between the cavity and the formed article in the cavity as the core and cavity separate in such a volume and at such pressure as will maintain the formed article in substantially complete and constant contact with the core until the article is free from the cavity. Once the article is free from the cavity, the article is then separated from the core in a conventional manner.

The adjective "unitary," when applied to mold cavities in this application, is intended to mean that the cavity has no side core or slide-action element and is not a split cavity which separates one part from the other. A unitary mold cavity, as that term is used in this specification, may be constructed of more than one piece of metal; but if so constructed, the pieces remain in fixed relation one to the other throughout the molding operation.

In particular, the invention is directed to the process for molding an article between a mold core and a unitary mold cavity, the article having a flange being formed during the process as a consequence of the existence of an undercut existing in a first surface of the cavity, by providing a means on a second surface of the mold cavity adjacent the undercut for forming a flexural region in the article in proximity to the flange, injecting a fluid between the cavity and the molded article as the core and cavity separate in such a volume and at such a pressure as will maintain the article in substantially complete and constant contact with the core as the article is withdrawn from the cavity, the flexural region allowing the flange to conform to the cavity wall until the article is free of the cavity, and subsequently separating the molded article from the mold core in a conventional manner.

Further, the invention is directed to molded articles having a flange formed during the molded process on a first surface of the article and having a groove or other means formed on a second surface of the article adjacent the flange, the groove or other means being of such a configuration as will permit the flange to collapse at least partly into the groove or other means while the article is being removed from the mold cavity.

A particularly advantageous feature achieved by the present invention is the inclusion of a radial flange at the bottom of a straight wall container, the flange extending radially outwardly to permit the retention on the straight wall container of a circumferentially encompassing label of paper or the like which is applied to the container subsequent to being molded to identify the contents within the container.

An advantage of the present invention is the formation of flanges and other configurations in articles of molded thermoplastics in the absence of any split cavity or a side core or slide-action element in the cavity of the mold forming such an article, thereby greatly simplifying mold design.

These and other features and advantages of the present invention will become apparent to those skilled in the art upon considering the following description of preferred embodiments and examples illustrative of the invention together with the accompanying figures, wherein.

Figure 1:
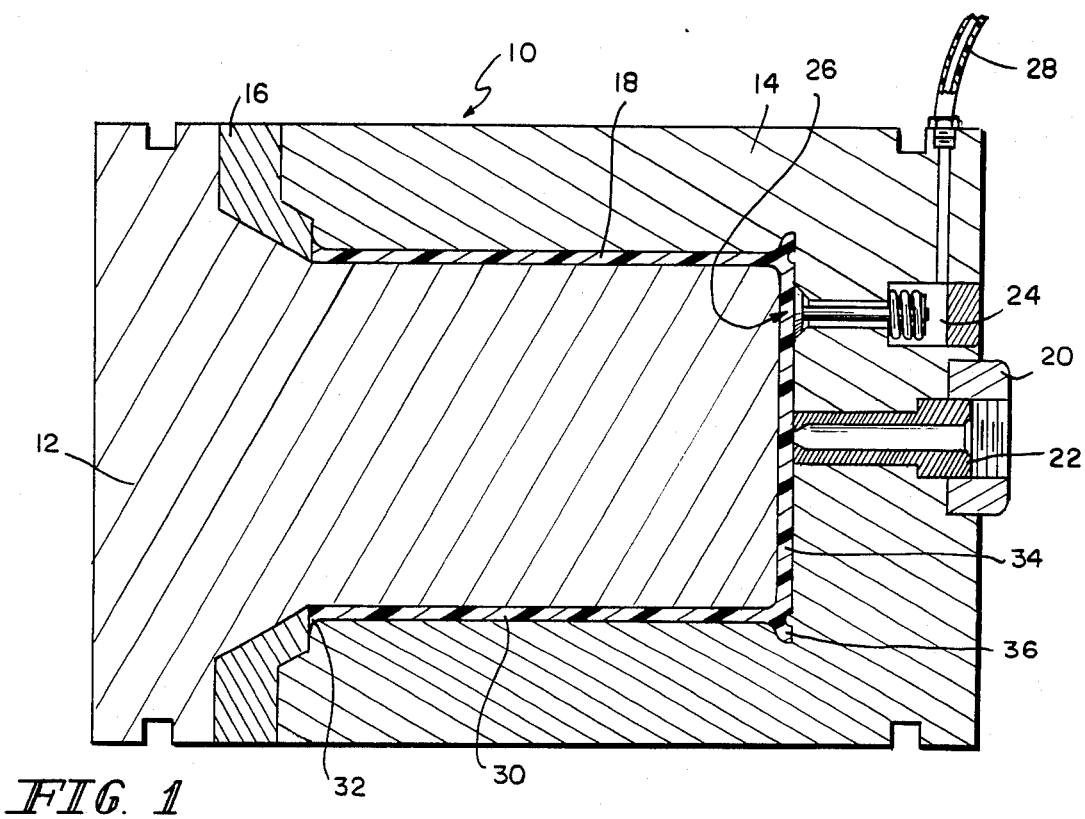
FIG. 1 is a sectional view of a mold incorporating the features of the present invention.

FIG. 1 shows a mold 10 comprising a core 12, a unitary cavity 14, and a stripper ring 16 for removing the molded article 18 from the core 12. The unitary cavity 14 includes a locating ring 20 and a sprue bushing 22 through which the molten viscous plastic is injected into the space between the core 12 and cavity 14 to form the article 18. A valve 24 is included in the cavity 14, the valve being biased toward a closed position such that a surface 26 of the valve is a continuation of the surrounding surface defining the space between the core 12 and cavity 14 in which the molded article 18 is formed. The valve 24 is connected to a source (not shown) of high-pressure fluid such as air through conduit 28.

The article 18 shown in FIG. 1 constitutes a container having a straight wall 30 having an outwardly flared lip 32 at the mouth of the container. The bottom 34 of container 30 is generally planar, and includes a flange 36 which extends radially outwardly beyond the outermost dimension of the straight walls 30. It was the practice of the prior art, when forming an article such as 18 having an outwardly extending flange 36, to form such an article in a split cavity, the walls of which would move outward so as to permit withdrawal of flange 36.

In accordance with the present invention, after the article 18 has been formed in the space between the core 12 and cavity 14, a fluid such as air is supplied through conduit 28 and valve 24 just before or as the mold opens, the fluid thus being applied to the bottom 34 of the container at a pressure and volume such as will maintain the bottom 34 in substantially complete and constant contact with core 12 as the core 12 and article 18 are withdrawn from cavity 14. The flange 36 deflects radially inwardly and acts as a sealing ring around the periphery of the bottom 34 of container 18 as the container 18 and core 12 withdraw from the cavity 14. As the flange 36 encounters the lip 38 of the cavity, the air or other fluid in the cavity will cause the flange 36 to reassume its originally molded position. The container 18 can then be removed from core 12 by conventional means such as with the aid of the stripper ring 16. It will be appreciated that an ejector sleeve, ejector blade, or stripper plate may be used in lieu of the stripper ring 16.

After the flange 36 of the container has expanded outwardly after clearing lip 38 of the cavity, the air or other fluid being injected through conduit 28 can be eliminated and valve 24 will reassume its closed position shown in FIG. 1.

Figure 2:
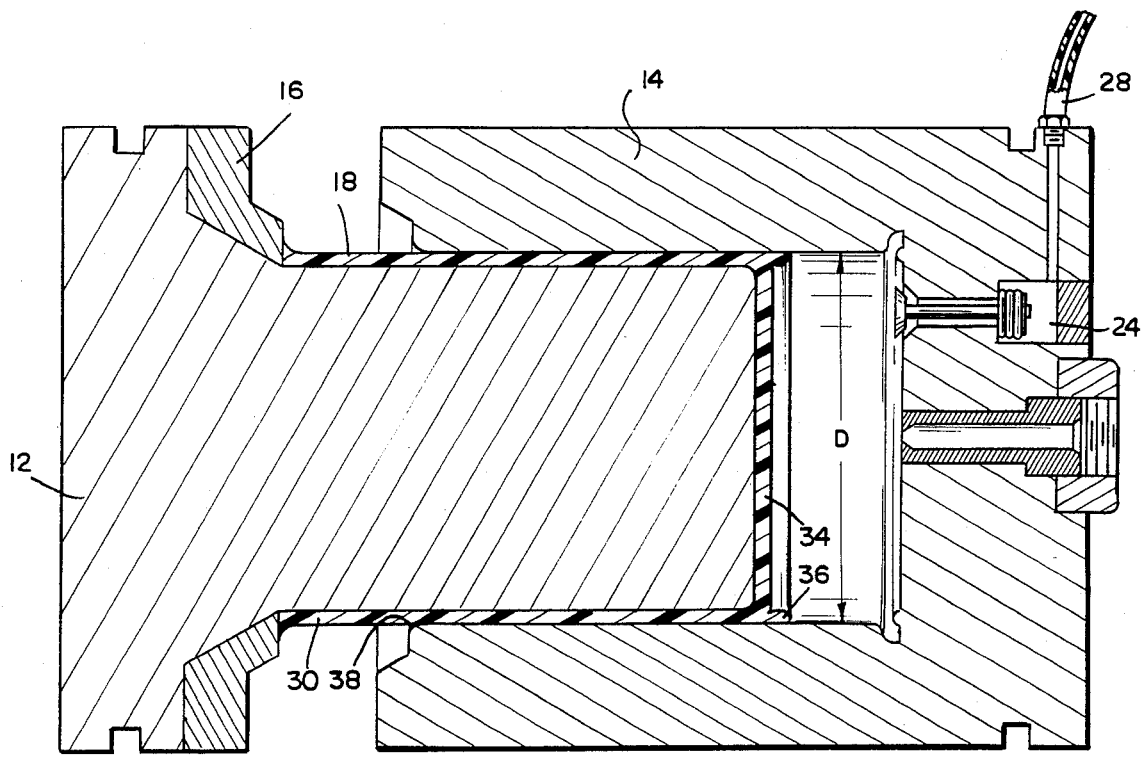
FIG. 2 is a sectional view of the mold shown in FIG. 1 with the mold in the process of ejecting a molded article therefrom.
Figure 3:
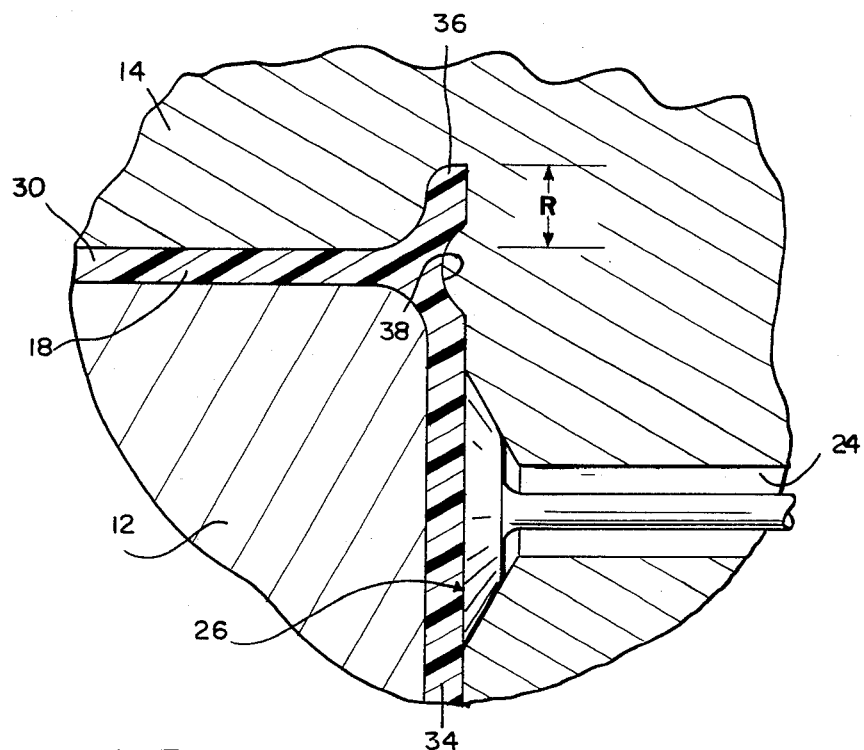
FIG. 3 is a sectional detail of the mold shown in FIG. 1.

In FIG. 3, a detail taken from FIG. 1, it will be seen that flange 36 extends a radial distance R outside the diameter D shown in FIG. 2. By way of example, a container 18 according to the present invention was molded in a mold substantially as illustrated in FIGS. 1-4 wherein the outside diameter D was 4.25 inches with the thickness of wall 30 being typically 0.062 inch. The flange 36 projected a distance R=0.120 inch. There was provided a groove 38 in the bottom 34 of the container 18, the groove 38 being approximately centered but perhaps slightly inside the center of wall 30, the depth of the groove being approximately one-half the thickness of bottom 34. The container was molded out of Union Carbide 7904 at the temperature and pressure suggested by the manufacturer of the resin. Air was introduced against the bottom 34 of the container at a pressure of about 100 psi in sufficient volume to maintain that approximate pressure as the core 12 was withdrawn from the cavity 14. As the flange 36 cleared the lip 38 of the cavity, the introduction of air into the cavity was terminated and the flange 36 returned to the original position illustrated in FIG. 3. The cycle time for the molding procedure was approximately 8 seconds, with the time between completion of injection and mold opening being approximately 1.5 seconds. These times were about the minimum times possible under the particular molding conditions employed. The container thus formed was satisfactory in every respect, the flange 36 being permanently fixed in a radially outward position as originally molded. It will be appreciated that the dimensions and times given are merely intended as an example and not by way of limitation on this invention.

Figure 4:
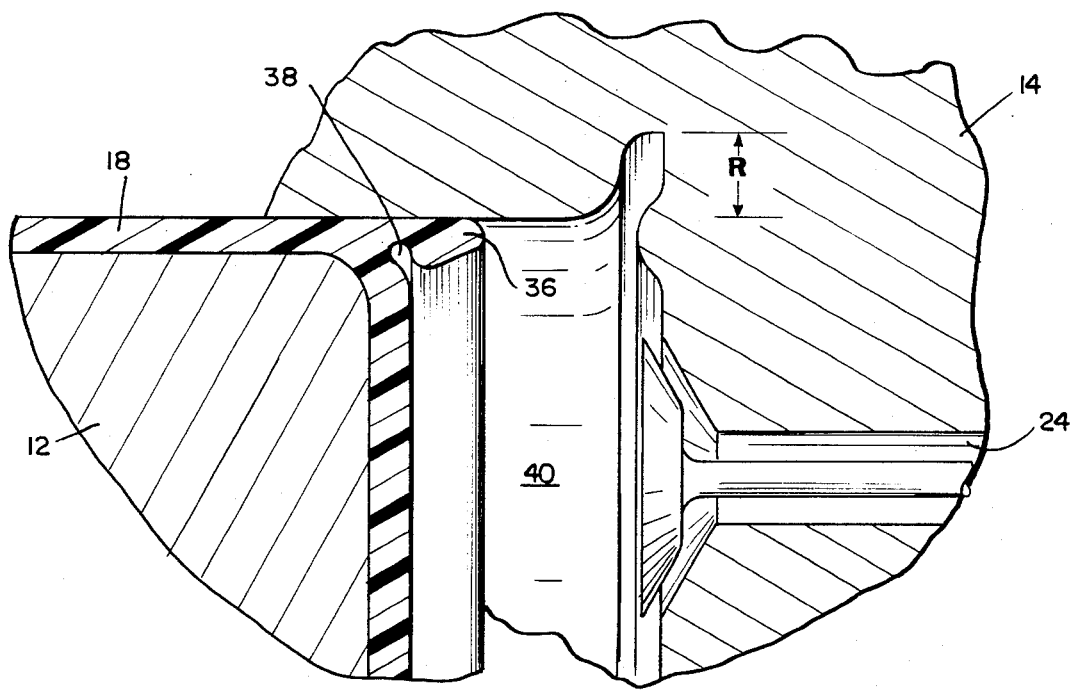
FIG. 4 is a sectional detail of the view shown in FIG. 3 with the molded article in the process of being ejected from the mold.

As will be seen in FIG. 4, the groove 38 is caused to reduce in dimension as flange 36 deflects radially inwardly when the core 12 and container 18 are withdrawn from cavity 14. The radially outward force exhibited by flange 36 on the inside wall of cavity 14 acts to seal the cavity, thereby permitting large pressures to be built up within the chamber 40 which is created as the core 12 and article 18 are withdrawn from cavity 14. It is believed that groove 38 is necessary in order that the inward flexing of flange 36 can occur. In the absence of groove 38, the flange 36 is torn from the bottom of the container wall 30 or is permanently deformed in such a manner as will prevent flange 36 from returning to the originally molded position once the container 18 is fully removed from cavity 14.

While the container illustrated in FIGS. 1-4 is a straight wall container, it will be appreciated that both flared and reversed draft containers might also be formed having a flange such as that illustrated in the bottom utilizing the unitary cavity intended by this invention. The design of the valve 24 is not critical to the invention, but valve 24 must permit the introduction of fluid into chamber 40 which is formed as the core 12 and container 18 are removed from cavity 14 at such a pressure and in such a volume as will maintain bottom 34 in substantially complete and constant contact with the core 12 until the article 18 is free from cavity 14.

Figure 5:
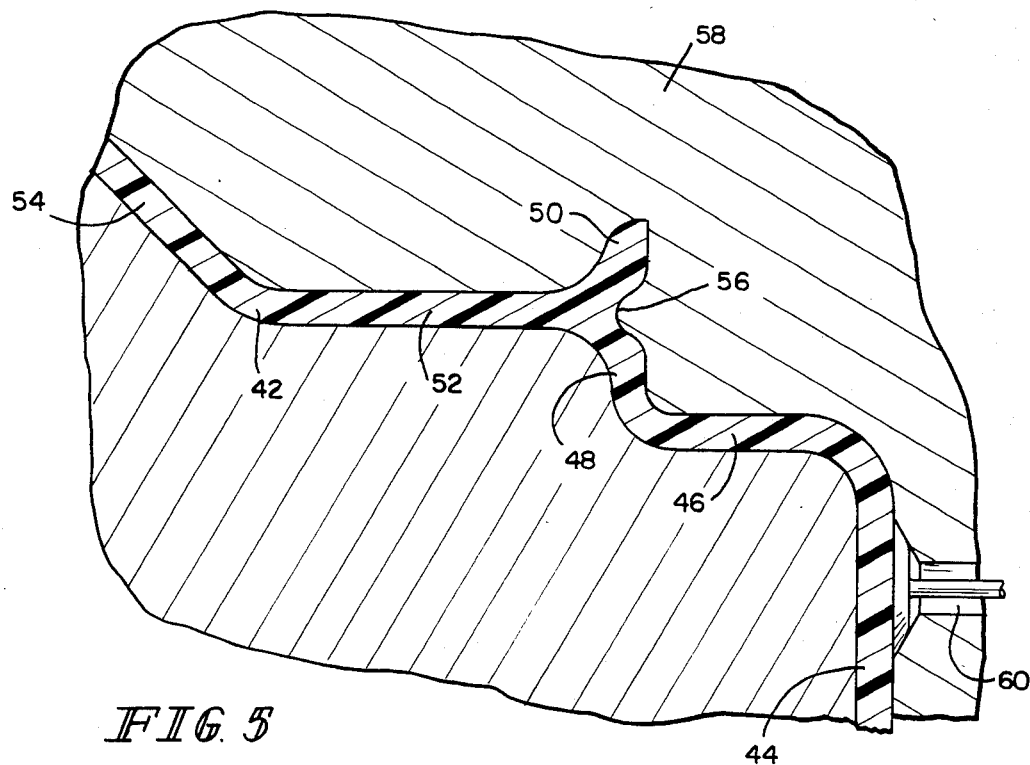
FIG. 5 is a sectional detail of an alternative embodiment of a mold according to the present invention.
Figure 6:
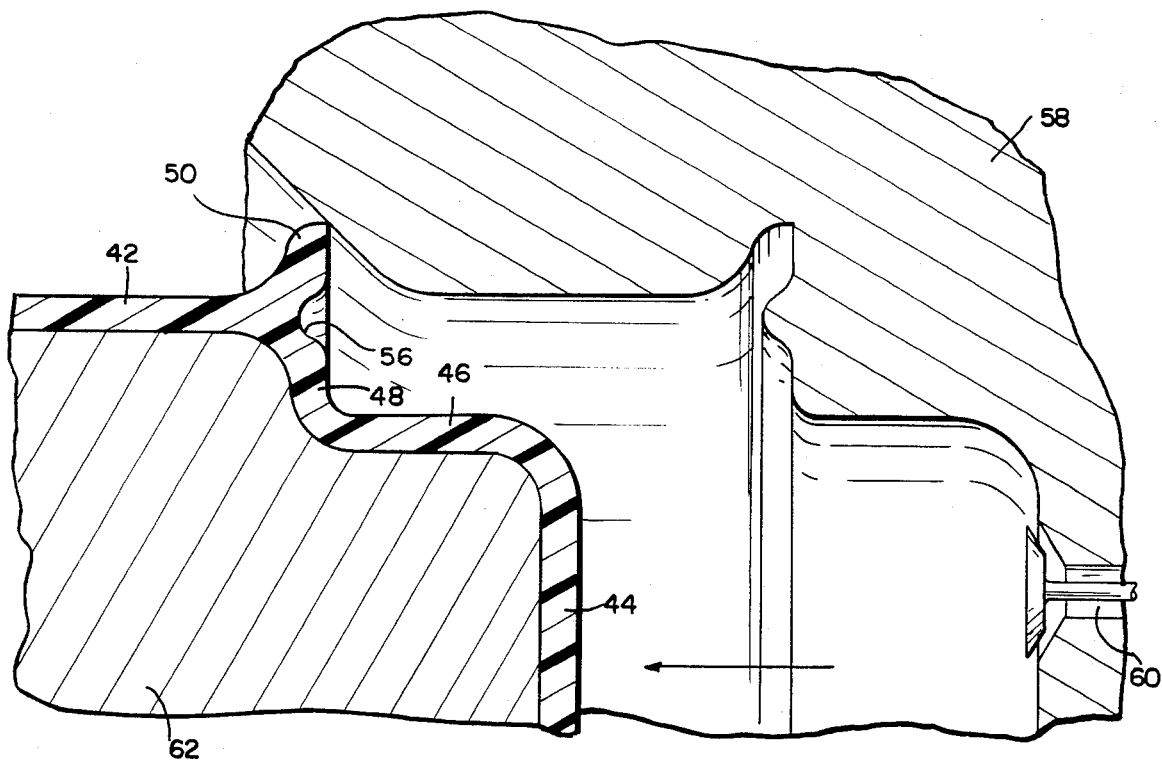
FIG. 6 is a sectional detail of the mold shown in FIG. 5 at the point that the article is free from the mold cavity.

Another embodiment of an article 42 formed according to the present invention is shown in FIGS. 5 and 6, the article 42 having a bottom 44 smoothly merging with a first side section 46. At a top of the first side section 46, an outwardly flared portion 48 extends radially outward and includes a flange 50. A second wall portion 52 extends upwardly from radially flared portion 48 inside the dimension of flange 50 and at an upward edge thereof tapers outward over tapered portion 54. A groove 56 is provided in the bottom of the radial portion of the article 42 adjacent flange 50 in such a manner as to permit the inward flexing of flange 50 at such time as the molded article 42 is removed from cavity 58. A valve 60 is provided adjacent the bottom 44 of the article 42 through which can be injected a fluid such as air. As the article 42 and core 62 are withdrawn from the cavity 58 as shown in FIG. 6, the flange 50 collapses radially in part into groove 56, and the pressurized fluid entering through valve 60 maintains the bottom 44, first side portion 46, and radial portion 48 in contact with core 62. As the core 62 arrives at the position shown in FIG. 6, the flange 50 expands outward to resume the position shown, thereby forming the outwardly extending flange desired in the finished article 42. The position shown in FIG. 6 is deemed to be that position where the article 42 is "free from the cavity" and is the point at which the introduction of fluid through valve 60 can be terminated.

The process of the present invention may be employed to produce various configurations, and is not intended to be limited to merely the container art. Nevertheless, the invention has particular utility in the manufacture of containers having a radially outwardly extending flange on the bottom of the container. It will be appreciated that where a flange is formed on the bottom of a container according to the method disclosed, the container will include a groove on a bottom surface of the container approximately aligned with the wall of the container for permitting the flange to collapse radially inwardly during the ejection phase of the molding process, the flange emerging from the mold and re-orienting itself to its original molded position. As the flange dimension R increases, it is believed that the wall thickness and groove size must also increase to permit the necessary radially inward collapse of the flange during ejection.

While the invention has been described with reference to a specific example and various embodiments, it is intended that the embodiments in the example be illustrative and not limiting, the limits of the invention to be found solely in the appended claims.

What is claimed is:

1. A process for molding an article having a flange between a mold core and a unitary mold element which cooperates with the mold core to form a mold space, the flange being formed during the process as a consequence of the existence of an undercut existing in a first surface of the unitary mold element, the process comprising the steps of:
   providing a ridge on a second surface of the unitary mold element adjacent the undercut,
   injecting a fluid between the unitary mold element and the molded article as the core and unitary mold element separate in such a volume and at such a pressure as will maintain the article in substantially complete and constant contact with the core as the core and article are withdrawn from the unitary mold element, the flange conforming to the unitary mold element wall until the article is free from the unitary mold element, and subsequently separating the molded article from the mold core.

2. A process for molding an article incorporating a flange using a mold unit including a unitary mold element which cooperates with a mold core to form a mold space within which the article can be molded, the mold core being displaceable in a predetermined direction relative to the unitary mold element for the purposes of enabling removal of the molded article and incorporated flange from the unitary mold element characterized by the steps of
   providing a first surface of the mold element with a recessed or undercut region for forming the flange during the molding of the article,
   providing on a second surface of the mold element adjacent to the undercut region means for releasing the flange from the undercut region during the withdrawal of the mold core and the article from the mold space,
   pressurizing the interior of the mold space during the displacement of the core along said direction, by means of a fluid which is of such volume and pressure as to ensure that the molded article moves with the core during its displacement in said direction, and
   upon the freeing of the flange from the mold space, permitting the flange to return into its required position or setting with respect to the remainder of the article.

3. A process as claimed in claim 2, and further characterized by the steps of providing sufficient fluid pressure within the mold space to enable the flange to conform to the wall of the mold element during the withdrawal of the article from the mold space, and, upon release of the flange from the mold space, assisting the return of the flange from its position during its travel lengthwise of the mold space to its required position by the exiting of the fluid pressure from the mold.

4. A process as claimed in claim 2, and further characterized in that the means for releasing the flange provided on the second surface of the mold element includes a raised or ridge portion which, during the molding operation serves to produce a complementary recessed region at the transition zone between the flange and the remainder of the article.

5. A process as claimed in claim 3, and further characterized in that the means for releasing the flange on the second surface of the mold element includes a raised or ridge portion which, during the molding operation serves to produce a complementary recessed region at the transition zone between the flange and the remainder of the article.

6. A process as claimed in claim 2, and characterized in that the undercut or recessed region is so located within the mold element that the flange is formed at an end of the article.

7. A process as claimed in claim 3, and characterized in that the undercut or recessed region is so located within the mold element that the flange is formed at an end of the article.

8. A process as claimed in claim 4, and characterized in that the undercut or recessed region is so located within the mold element that the flange is formed at an end of the article.

9. A process as claimed in claim 1, and characterized in that the undercut or recessed region is so located within the mold element that the flange is formed intermediate of the ends of the article.

10. A process as claimed in claim 2, and characterized in that the undercut or recessed region is so located within the mold element that the flange is formed intermediate of the ends of the article.

11. A process as claimed in claim 3, and characterized in that the undercut or recessed region is so located within the mold element that the flange is formed intermediate of the ends of the article.

12. A process as claimed in claim 1, and characterized in that the undercut or recessed region is so located within the mold element that the flange is formed intermediate the end of the article.

13. A process as claimed in claim 1, and characterized in that the undercut or recessed region is so located within the mold element that the flange is formed intermediate the end of the article.

* * * * *